May 26, 1953     F. A. PACHMAYR     2,639,507
LATCH MEANS FOR TELESCOPIC GUN SIGHTS
Filed Dec. 19, 1949
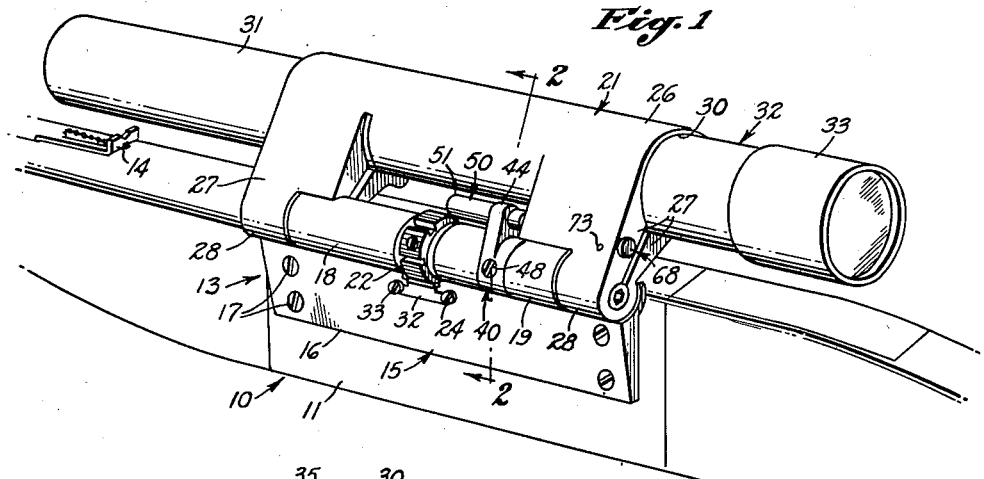
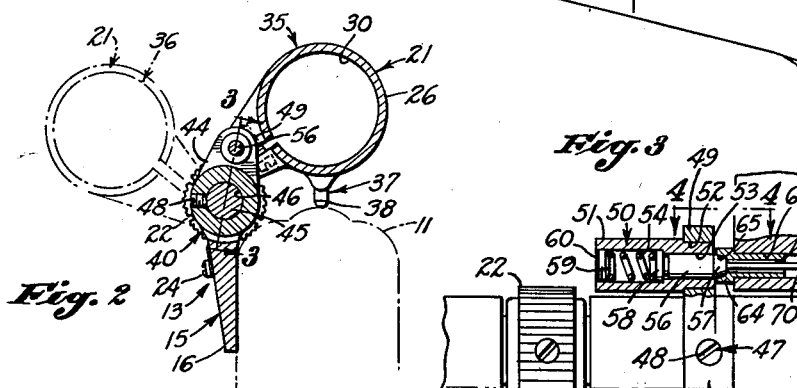
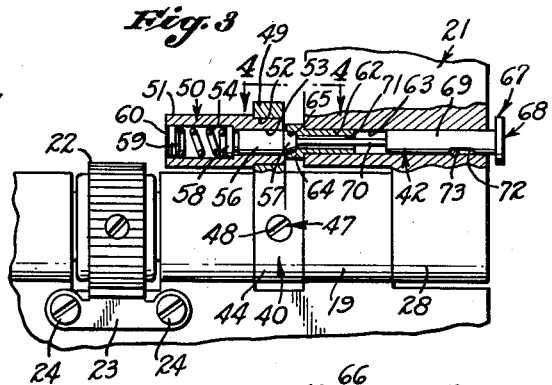
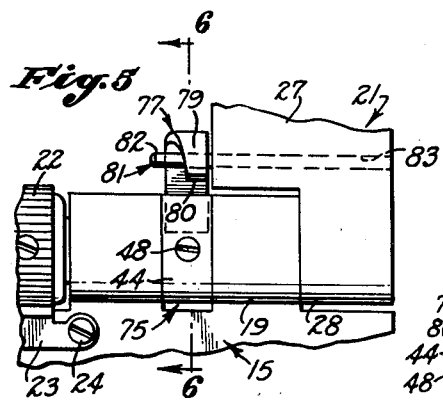
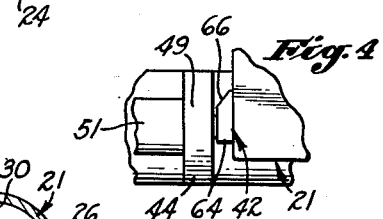
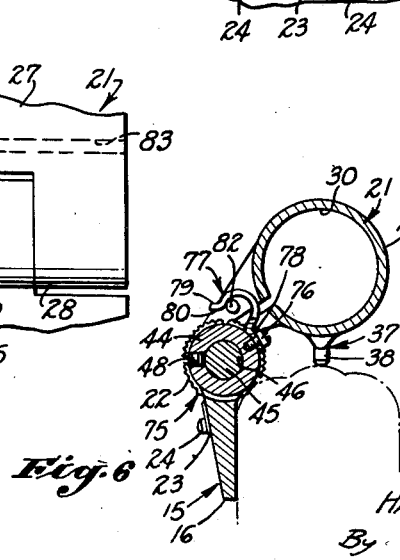
INVENTOR:
FRANK A. PACHMAYR
BY HIS ATTORNEYS
HARRIS, KIECH, FOSTER & HARRIS Patented May 26, 1953

2,639,507

UNITED STATES PATENT OFFICE 2,639,507

LATCH MEANS FOR TELESCOPIC GUN SIGHTS

Frank A. Pachmayr, Culver City, Calif.

Application December 19, 1949, Serial No. 133,735

16 Claims. (Cl. 33—50)

1

This invention relates to mounts for telescopic sights and, more particularly, to a mount for a telescopic sight having embodied therein adjustable latch means for retaining the movable carriage of the mount in a predetermined position with reference to the gun with which said mount is associated.

Telescopic sight mounts of the character with which my invention is concerned usually include a base which is securable to the receiver of a gun and a movable carriage which can be moved from an inoperative position to an operative position to permit the user of the gun to swing the telescopic sight into and out of said operative position. Naturally, the accuracy with which the carriage is held in said operative position, the facility with which the carriage can be moved between said operative and inoperative positions and the ease with which the operative position can be selected are factors which materially contribute to the effective usage of the telescopic sight secured in the mount.

Attempts have been made to accomplish the accurate locating of the carriage of previous mounts in the operative position by providing upon the mount latch means for retaining the carriage of the mount in said operative position but, due to the inherent design of such latch means, it has been impossible to accurately position and fixedly retain the carriage in the operative position. A major cause of the difficulties encountered in prior art latch means has been the fact that such latch means permitted a certain amount of slope to occur when the carriage was in the operative position which detracted from the accuracy with which the telescopic sights could be utilized.

It is, therefore, a primary object of my invention to provide a mount for a telescopic sight having embodied therein adjustable latch means for retaining the carriage of said mount in an operative position upon the gun with which said mount is associated.

Another object of my invention is the provision of a mount for a telescopic sight which embodies adjustable latch means for maintaining the carriage of said mount in operative position and in which said latch means permits the easy movement of said carriage between said operative and inoperative positions.

An additional object of my invention is the provision of a mount for telescopic sights which has embodied therein an adjustable latch means adapted to cooperate with positioning means on the carriage of the mount to accomplish the positive retention of said carriage in an operative position upon the gun with which said mount is associated.

A further object of my invention is the provision of a mount for telescopic sights which has embodied therein adjustable latch means, said adjustable latch means being rotatable into any one of a plurality of positions to permit said latch means to be so set as to accomplish the accurate positioning of the carriage of said mount in its operative position.

A further object of my invention is the provision of a mount for telescopic sights which has embodied therein adjustable latch means for accurately positioning the carriage of said mount upon the gun with which said mount is associated and in which said adjustable latch means has incorporated therein locking means for securing said adjustable latch means in any one of a plurality of latching positions.

Another object of my invention is the provision of a mount for telescopic sights which embodies adjustable latch means secured in the base of the mount and adapted to cooperate with detent means on the carriage of said mount to retain said carriage in operative position with respect to a gun upon which said mount is secured.

An additional object of my invention is the provision of a mount for telescopic sights which includes adjustable latch means secured to the base of said mount, said adjustable latch means having catch means incorporated therein adapted to cooperate with detent means on the carriage of said mount to securely position said carriage upon a gun with which said mount is associated.

A further object of my invention is the provision of a mount for telescopic sights which includes adjustable latch means secured to the base of the mount and adapted to cooperate with detent means on the carriage of the mount, said detent means having associated therewith release means adapted to disengage said adjustable latch means from said detent means.

Other objects and advantages of my invention will be apparent from the following specification and the accompanying drawing, which is for the purpose of illustration only, and in which:

Fig. 1 is a perspective view of a gun having secured thereto a mount constructed in accordance with my invention;

Fig. 2 is a vertical sectional view taken on the broken line 2—2 of Fig. 1;

Fig. 3 is a partly sectional view taken on the broken line 3—3 of Fig. 2;

Fig. 4 is an enlarged fragmentary view taken from the broken line 4—4 of Fig. 3;

Fig. 5 is an enlarged fragmentary view showing another embodiment of my invention; and Fig. 6 is a vertical sectional view taken on the broken line 6—6 of Fig. 5.

Referring to the drawing, and particularly to Fig. 1 thereof, I show a gun 10 upon the receiver 11 of which is mounted a telescopic sight mount 13 constructed in accordance with my invention. Rear iron sights 14 are secured to the gun 10 adjacent the receiver 11 thereof.

The telescopic sight mount 13 includes a base 15 which incorporates an attachment plate 16 secured to the side of the receiver 11 by means of screws 17. Formed integrally with and upon the upper edge of the attachment plate 16 are longitudinally oriented barrels 18 and 19 which contain the adjustment mechanism, not shown, for controlling the freedom of pivotal movement of the carriage 21 of the telescopic sight mount 13. The adjustment mechanism is controlled by the rotation of a knurled control knob 22 which is held in a selected position by means of a spring ratchet 23 attached to the side of the attachment plate 16 by means of screws 24. The adjustment mechanism, not shown, also provides the pivotal mounting for the carriage 21 of the telescopic sight mount 13 and the rotation of the knurled control knob 22 determines the degree of freedom with which the carriage 21 is permitted to pivot upon the base 15.

The carriage 21 of the mount 13 includes a substantially tubular body portion 26 which has integrally formed therewith mounting legs 27 joined at their lower ends by substantially cylindrical mounting bosses 28 adapted to pivotally engage the adjustment mechanism, not shown, housed in the barrels 18 and 19 of the base 15. The tubular body portion 26 of the carriage 21 provides an elongated bore 30 for receiving the shell 31 of a telescopic sight 32 upon one end of which is mounted an eye-piece 33.

The carriage 21, as best seen in Fig. 2 of the drawing, is adapted to be moved from a first, operative position, as indicated by the arrow 35, over the receiver 11 of the gun 10, to a second inoperative position, generally indicated by the arrow 36. To insure the proper spacing of the carriage 21 from the top of the receiver 11 and to provide a means of support for the carriage 21 when it is positioned in the first, operative position, there is provided a positioning means 37 which is constituted, in the present instance, by a generally cylindrical pin 38 which is, as best seen in Fig. 2, adapted to contact the top of the receiver 11 when the carriage 21 is in the first, operative position.

Thus, when the telescopic sight 32 is in use, the carriage 21 is positioned in the first, operative position over the receiver 11 of the gun 10 and when the sight 32 is not used it is positioned to one side of the receiver 11 in the second, inoperative position 36. It is most desirable that the telescopic sight 32 be susceptible to ready movement between the first and second positions and that, when in said first position, it be accurately positioned over the receiver 11 and securely retained in the operative position. To accomplish these desired ends, I provide adjustable latch means 40 mounted upon the base 15 of the mount 13 and adapted to cooperate with detent means 42 mounted in one of the legs 27 of the carriage 21.

The adjustable latch means 40 includes an annular collar 44 which encompasses an elongated, non-rotatable shaft 45 positioned in a bore 46 formed in the barrel 19 of the base 15, said annular collar being disposed in a vertical opening in the barrel 19. The annular collar 44 is rotatable about the shaft 45 and has incorporated therein locking means 47 constituted by a set screw 48 for preventing, at will, the rotation of the annular collar 44 in respect to the shaft 45. For further details of the construction, reference is hereby made to my copending application Serial No. 133,736. It is, of course, understood that the shaft 45 is held against rotation within the bore 46 by key means, not shown, so that when the collar 44 is locked to the shaft 45 by the set screw 48, the rotation thereof will be prevented. The rotation of the annular collar 44 upon the shaft 45, when the set screw 48 is released, permits the adjustable latch 40 to be moved into any one of a plurality of positions and to be locked in any one of said positions by the locking means 47 in a manner which will be described in greater detail below.

Formed upon and integrally with the annular collar 44 is a generally triangular boss 49 in which is mounted a catch means 50 of the adjustable latch means 40. The catch means 50 includes a substantially cylindrical housing 51, one end of which is pressed into a bore 52 formed in the triangular boss 49. A bore 53 is formed in the interior of the cylindrical housing 51 of the catch means 50 and communicates with a counterbore 54 therein. Positioned in the bore 53 is a locking pin 56 which has a frusto-conical end 57 adapted to engage the detent means 42 of the carriage 21 and a head 58 upon which is seated one end of a compression spring 59, the opposite end of which engages a plug 60 threaded into the end of the counterbore 54. The locking pin 56 of the catch means 50 embodied in the adjustable latch means 40 is thus continually biased by the spring 59 into engagement with the detent means 42 of the carriage 21.

The detent means 42 of the carriage 21 includes a generally cylindrical member 62 pressed into a bore 63 formed in the leg 27 and having an enlarged cylindrical portion constituting a strike 64 which has formed therein a substantially frusto-conical seat 65 adapted for the reception of the frusto-conical end 57 of the locking pin 56 of the catch 50, as best seen in Fig. 3 of the drawing. To facilitate the entry of the frusto-conical end 57 of the locking pin 56 into the frusto-conical seat 65 provided by the strike 64, a cam surface 66 is formed upon the exterior of the strike 64 and is adapted to urge the frusto-conical end 57 of the locking pin 56 inwardly against the spring 59 to prevent the end 57 of the locking pin 56 from being caught against the strike 64 and to facilitate the seating of the frusto-conical end 57 of the locking pin 56 in the frusto-conical seat 65.

The detent means 42 of the carriage 21 also includes release means 67 which comprises a plunger 68 having a shaft 69 mounted in the end of the bore 63 opposite to that in which the cylindrical member 62 is mounted. Formed integrally with the shaft 69 of the plunger 68 is a release pin 70 which traverses a bore 71 formed on the interior of the cylindrical member 62 to permit the entry of the end of said release pin into the frusto-conical seat 65 formed in the strike 64. The plunger 68 is retained in the end of the bore 63 in the leg 27 by means of a key 73 which engages a kerf 72 formed in the periphery of the shaft 69 of the plunger. As may be best seen from Fig. 3 of the drawing, when the frusto-conical end 57 of the locking pin 56 is in engagement with the frusto-conical seat 65 formed in the strike 64, the end of the releasing pin 70 contacts the frusto-conical end 57 of the locking pin 56 and is urged outwardly from the bore 63 in the leg 27. When it is desired to release the locking pin 56 from the strike 64, the plunger 68 is urged inwardly to cause the releasing pin 70 to shift the locking pin 56 to the left, as seen in the drawing, against the spring 59 and to thus release the frusto-conical end 57 of the locking pin 56 from the frusto-conical seat 65.

The setting of the adjustable latch 40 is accomplished by moving the carriage 21 into the first, operative position and causing the pin 38 to seat firmly upon the top of the receiver 11 of the gun 10. The set screw 48 which holds the collar 44 against movement on the shaft 45 is released to permit the rotation of the catch means 50 with the collar 44 into a position to engage the detent means 42 of the carriage 21. When the locking pin 56 is seated in the seat 65 of the strike 64 and while holding the carriage 21 firmly in engagement with the top of the receiver 11 by means of the pin 38, the set screw 48 is urged against the periphery of the shaft 45 to lock the collar 44 against rotational movement in respect thereto. Thus, the adjustable latch 40 permits the carriage 21 to be maintained in the first, operative position upon the top of the receiver 11 and locked in said position to prevent the movement of the carriage in reference to the top of the receiver. If it is desired, for any reason, to swing the carriage 21 into the second, inoperative position, the plunger 68 is depressed to release the locking pin 56 from the strike 64 and the carriage 21 may then be swung over to the second, inoperative position. When it is desired to return the carriage 21 to the first, operative position, the carriage 21 is swung over until the pin 38 engages the top of the receiver 11 and the locking pin 56 will then automatically enter the frusto-conical seat 65 of the strike 64.

Shown in Figs. 5 and 6 of the drawing is another embodiment of my invention, identical reference numerals being used to indicate those portions of the embodiment which are the same as those of the above-discussed embodiment. An adjustable latch means 75 is provided in the base 15 of the mount 13 and consists of the rotatable collar 44 mounted upon the shaft 45 in the bore 46 of the barrel 19. The set screw 48 is provided which holds the collar 44 against rotation upon the shaft 45. Secured to the periphery of the collar 44 by means of a screw 76 or similar fastener is a catch means 77 which includes a substantially arcuate mounting portion 78 and a locking portion 79 formed integrally therewith, said locking portion defining, in conjunction with the periphery of the collar 44, an entry opening 80 through which is adapted to pass detent means 81 mounted in the arm 27 of the carriage 21. The detent means 81 includes a substantially cylindrical pin 82 pressed into a bore 83 formed in the leg 27 of the carriage 21.

To adjust the adjustable latch means 75 to accurately retain the carriage 21 in the first, operative position it is necessary to move the carriage 21 until the pin 38 contacts the top of the receiver 11 of the gun 10. The set screw 48 in the collar 44 is then released to permit the rotation of the collar 44 in reference to the shaft 45 and the collar 44 is then rotated until, as best seen in Fig. 6 of the drawing, the pin 82 of the carriage 21 contacts the inner side of the free end of the locking portion 79 of the catch means 77. When the interior of the free end of the locking portion 79 of the catch means 77 is in firm contact with the locking pin 82, the set screw 48 can be tightened against the periphery of the shaft 45 to lock the collar 44 against movement relative thereto.

In this manner, the carriage 21, as best seen in Fig. 6 of the drawing, is locked in the first, operative position upon the top of the receiver 11. When it is desired, for any reason, to move the carriage 21 from contact with the top of the receiver 11, the carriage 21 is grasped and rotated to cause the rotation of the pin 82 of the carriage and to cause the deflection of the free end of the locking portion 79 of the catch means 77. This permits the pin 82 to be freed from engagement with the locking portion 79 of the catch means 77 and allows the carriage 21 to be moved from the first, operative position to the second, inoperative position.

When it is desired to return the carriage 21 to the first, operative position, the carriage is swung to bring the pin 82 into contact with the free end of the locking portion 79 of the catch means 77. Continued movement of the carriage 21 urges the locking pin 82 against the free end of the locking portion 79 of the catch means 77 and deflects it sufficiently to permit the passage of the locking pin 82 through the entry opening 80 between the free end of the locking portion 79 and the periphery of the collar 44.

Although I have shown and described embodiments of my invention to illustrate the construction and mode of operation thereof, it is obvious that changes, alterations and modifications may be made in the specific details of construction and I, therefore, do not desire to be limited to such details but prefer, rather to be afforded the full scope of the following claims.

I claim as my invention:

1. In a mount for a telescopic sight, the combination of: a base for attachment to a gun; a carriage for said telescopic sight pivotally mounted upon said base for rotation between a first, operative position and a second, inoperative position; and rotatably adjustable latch means for retaining said carriage in said first, operative position, said latch means being infinitely adjustable to permit said carriage to be oriented in any chosen first position.

2. In a mount for a telescopic sight, the combination of: a base for attachment to a gun; a carriage for said telescopic sight pivotally mounted upon said base for rotation between a first, operative position and a second, inoperative position; detent means on said carriage; and rotatably adjustable latch means for engaging said detent means to retain said carriage in said first, operative position, said latch means being infinitely adjustable to permit said carriage to be oriented in any chosen first position.

3. In a mount for a telescopic sight, the combination of: a base for attachment to a gun; a carriage for said telescopic sight pivotally mounted upon said base for rotation between a first, operative position and a second, inoperative position; and rotatably adjustable latch means on said base for retaining said carriage in said first, operative position, said latch means being infinitely adjustable to permit said carriage to be oriented in any chosen first position.

4. In a mount for a telescopic sight, the combination of: a base for attachment to a gun; a carriage for said telescopic sight pivotally mounted on said base for rotation between a first, operative position and a second, inoperative position; detent means on said carriage; and rotatably adjustable latch means on said base for engaging said detent means to retain said carriage in said first, operative position, said latch means being infinitely adjustable to permit said carriage to be oriented in any chosen first position.

5. In a mount for a telescopic sight, the combination of: a base for attachment to a gun; a carriage for said telescopic sight pivotally mounted on said base for rotation between a first, operative position and a second, inoperative position; rotatable latch means for retaining said carriage in said first, operative position; and locking means embodied in said latch means for maintaining said latch means in any one of a plurality of positions.

6. In a mount for a telescopic sight, the combination of: a base for attachment to a gun; a carriage for said telescopic sight pivotally mounted on said base for rotation between a first, operative position and a second, inoperative position; detent means on said carriage; rotatable latch means for engaging said detent means to retain said carriage in said first, operative position; and locking means embodied in said latch means for maintaining said latch means in any one of a plurality of positions.

7. In a mount for a telescopic sight, the combination of: a base for attachment to a gun; a carriage for said telescopic sight pivotally mounted upon said base for rotation between a first, operative position and a second, inoperative position; detent means on said carriage; rotatable latch means on said base for engaging said detent means to retain said carriage in said first, operative position; and locking means embodied in said latch means for maintaining said latch means in any one of a plurality of positions.

8. In a mount for a telscopic sight, the combination of: a base for attachment to a gun; a carriage for said telescopic sight pivotally mounted upon said base for rotation between a first, operative position and a second, inoperative position; positioning means on said carriage for contacting said gun and for spacing said carriage a predetermined distance above said gun in said first, operative position; and rotatably adjustable latch means for retaining said carriage in said first, operative position, said latch means being infinitely adjustable to permit said carriage to be oriented in any chosen first position.

9. In a mount for a telescopic sight, the combination of: a base for attachment to a gun, said base having a longitudinal bore therein; a shaft in said longitudinal bore; a carriage for said telescopic sight pivotally mounted on said base for rotation between a first, operative position and a second, inoperative position; and infinitely adjustable latch means mounted on said shaft for retaining said carriage in said first, operative position.

10. In a mount for a telescopic sight, the combination of: a base for attachment to a gun, said base having a longitudinal bore therein; a shaft in said bore; a carriage for said telescopic sight pivotally mounted on said base for rotation between a first, operative position and a second, inoperative position; rotatable latch means mounted on said shaft for retaining said carriage in said first, operative position; and locking means embodied in said latch means for maintaining said latch means in any one of a plurality of positions.

11. In a mount for a telescopic sight, the combination of: a base for attachment to a gun, said base having a longitudinal bore therein; a shaft in said bore; a carriage for said telescopic sight pivotally mounted on said base for rotation between a first, operative position and a second, inoperative position; detent means on said carriage; and infinitely adjustable latch means mounted on said shaft for engaging said detent means and retaining said carriage in said first, operative position.

12. In a mount for a telescopic sight, the combination of: a base for attachment to a gun, said base having a longitudinal bore therein; a shaft in said bore; a carriage for said telescopic sight pivotally mounted on said base for rotation between a first, operative position and a second, inoperative position; detent means on said carriage; and adjustable latch means mounted on said shaft, said adjustable latch means including a collar encircling and rotatable on said shaft and catch means on said collar for engagement with said detent means on said carriage to retain said carriage in said first, operative position.

13. In a mount for a telescopic sight, the combination of: a base for attachment to a gun, said base having a longitudinal bore therein; a shaft in said bore; a carriage for said telescopic sight pivotally mounted on said base for rotation between a first, operative position and a second, inoperative position; detent means on said carriage; and adjustable latch means mounted on said shaft, said latch means including a collar encompassing and rotatable on said shaft and spring biased catch means on said collar for engagement with said detent means to retain said carriage in said first, operative position.

14. In a mount for a telescopic sight, the combination of: a base for attachment to a gun; a carriage for said telescopic sight pivotally mounted on said base for rotation between a first, operative position and a second, inoperative position; detent means on said carriage; adjustable latch means on said base, said adjustable latch means including catch means for engaging said detent means on said carriage to maintain said carriage in said first, operative position; and release means in said detent means on said carriage for disengaging said catch means of said adjustable latch from said detent means.

15. In a mount for a telescopic sight, the combination of: a base for attachment to a gun, said base having a longitudinal bore therein; a shaft in said bore; a carriage for said telescopic sight pivotally mounted on said base for rotation between a first, operative position and a second, inoperative position; detent means on said carriage; and adjustable latch means mounted on said shaft, said adjustable latch means including a collar encompassing said shaft and catch means mounted on said collar, said collar having locking means associated therewith for locking said collar to said shaft to maintain said catch means in a position to retain said carriage in said first, operative position.

16. In a mount for a telescopic sight, the combination of: a base for attachment to a gun; a carriage for said telescopic sight pivotally mounted on said base for rotation between a first, operative position and a second, inoperative position; detent means on said carriage; and adjustable latch means on said base, said adjustable latch means including spring catch means for engaging said detent means on said carriage to retain said carriage in said first, operative position.

FRANK A. PACHMAYR.

References Cited in the file of this patent

UNITED STATES PATENTS

| Number | Name | Date |
|---|---|---|
| 598,647 | Schade | Feb. 8, 1898 |
| 704,497 | Banks | July 5, 1902 |
| 1,083,288 | Lowe | Jan. 6, 1914 |
| 1,299,658 | Barrs | Apr. 8, 1919 |
| 1,440,713 | Ausbourne | Jan. 2, 1923 |
| 1,758,309 | Block | May 13, 1930 |
| 2,385,176 | White | Sept. 18, 1945 |
| 2,529,801 | Fisk | Nov. 14, 1950 |
| 2,571,935 | Pachmayr and Stokes | Oct. 16, 1951 |

FOREIGN PATENTS

| Number | Country | Date |
|---|---|---|
| 249,016 | Germany | 1911 |
| 468,237 | Great Britain | 1937 |